(12) United States Patent
Liu et al.

(10) Patent No.: US 11,129,038 B2
(45) Date of Patent: Sep. 21, 2021

(54) HYBRID CHANNEL QUALITY MEASUREMENT METHOD AND USER EQUIPMENT

(71) Applicant: NTT DOCOMO, INC., Tokyo (JP)

(72) Inventors: Min Liu, Beijing (CN); Xin Wang, Beijing (CN); Chongning Na, Beijing (CN); Yuichi Kakishima, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 42 days.

(21) Appl. No.: 16/607,116

(22) PCT Filed: May 3, 2018

(86) PCT No.: PCT/CN2018/085410
§ 371 (c)(1),
(2) Date: Oct. 22, 2019

(87) PCT Pub. No.: WO2018/202058
PCT Pub. Date: Nov. 8, 2018

(65) Prior Publication Data
US 2020/0196174 A1  Jun. 18, 2020

(30) Foreign Application Priority Data
May 4, 2017 (CN) .......................... 201710308731.6

(51) Int. Cl.
*H04W 4/00* (2018.01)
*H04W 24/08* (2009.01)
*H04B 7/06* (2006.01)
*H04L 5/00* (2006.01)
(Continued)

(52) U.S. Cl.
CPC .......... *H04W 24/08* (2013.01); *H04B 7/0626* (2013.01); *H04L 5/0048* (2013.01); *H04W 72/1273* (2013.01); *H04W 72/14* (2013.01)

(58) Field of Classification Search
None
See application file for complete search history.

(56) References Cited

U.S. PATENT DOCUMENTS

2014/0177601 A1* 6/2014 Nishio ................. H04W 76/27
370/332
2015/0263796 A1* 9/2015 Nam .................... H04B 7/0452
370/329

(Continued)

*Primary Examiner* — Clemence S Han
(74) *Attorney, Agent, or Firm* — Osha Bergman Watanabe & Burton LLP (57) ABSTRACT

A hybrid channel quality measurement method is presented. The method includes: performing a first channel measurement according to Channel State Information Reference Signals (CSI-RSs), and transmitting a first channel measurement feedback to a base station according to a first channel measurement result; determining whether to perform a second channel measurement feedback based on Demodulation Reference Signals (DMRSs) after the first channel measurement feedback is performed; and performing a second channel measurement according to the DMRSs when determining to perform the second channel measurement feedback, and transmitting the second channel measurement feedback to the base station according to a second channel measurement result.

20 Claims, 2 Drawing Sheets

(51) Int. Cl.
*H04W 72/12* (2009.01)
*H04W 72/14* (2009.01)

(56) References Cited

U.S. PATENT DOCUMENTS

| | | | |
|---|---|---|---|
| 2015/0288497 A1* | 10/2015 | Li | H04B 7/0639 370/329 |
| 2016/0143055 A1* | 5/2016 | Nammi | H04W 74/006 370/329 |
| 2018/0278298 A1* | 9/2018 | Takano | H04W 72/06 |
| 2018/0278317 A1* | 9/2018 | Onggosanusi | H04W 72/0406 |
| 2018/0287722 A1* | 10/2018 | Takano | H04B 7/0695 |
| 2019/0173548 A1* | 6/2019 | Zhang | H04L 25/0204 |
| 2019/0261329 A1* | 8/2019 | Park | H04L 5/0048 |
| 2019/0349052 A1* | 11/2019 | Yum | H04W 24/10 |
| 2019/0379431 A1* | 12/2019 | Park | H04W 72/04 |
| 2020/0067669 A1* | 2/2020 | Tang | H04W 72/042 |

* cited by examiner

HYBRID CHANNEL QUALITY MEASUREMENT METHOD AND USER EQUIPMENT

CROSS-REFERENCE TO RELATED APPLICATIONS

This application is a 371 U.S. National State of International Application No. PCT/CN2018/085410, filed on May 3, 2018, which claims priority to Chinese Application No. 201710308731.6, filed on May 4, 2017. The entire disclosures of the above applications are incorporated herein by reference.

TECHNICAL FIELD

The present invention relates to a field of wireless communication, and in particular to a hybrid channel quality measurement method and a user equipment that may be used in a wireless communication system.

BACKGROUND

Various types of channel measurement methods have been proposed, for example, a Non-Zero Power (NZP) Channel State Information Reference Signal (CSI-RS) based channel measurement, and a Zero Power (ZP) CSI-RS based channel measurement. In addition, with the application of large-scale Multiple-Input Multiple-Output (MIMO) antennas, compared to the traditional CSI-RS-based channel measurements, the interference applied on data channels received by a user terminal can more accurately reflect the channel quality thereof when the large-scale MIMO antennas are applied, especially when a Multi-User (MU) MIMO scheme is applied for communication. Therefore, a Demodulation Reference Signal (DMRS) based channel measurement is proposed.

However, in current communication systems, CSI-RSs and DMRSs need to be used for channel measurements separately, and therefore resource configurations need to be separately performed for different channel measurement schemes, which results in low resource utilization efficiency and is not favorable to the flexible use of resources.

SUMMARY OF THE INVENTION

According to one aspect of the present invention, there is provided a hybrid channel quality measurement method performed by a user equipment, comprising: performing a first channel measurement according to Channel State Information Reference Signals (CSI-RSs), and transmitting a first channel measurement feedback to a base station according to a first channel measurement result; determining whether to perform a second channel measurement feedback based on Demodulation Reference Signals (DMRSs) after the first channel measurement feedback is performed; performing a second channel measurement according to the DMRSs when determining to perform the second channel measurement feedback, and transmitting the second channel measurement feedback to the base station according to a second channel measurement result.

According to another aspect of the present invention, there is provided a user equipment comprising: a first feedback unit configured to perform a first channel measurement according to Channel State Information Reference Signals (CSI-RSs), and transmit a first channel measurement feedback to a base station according to a first channel measurement result; a determination unit configured to determine whether to perform a second channel measurement feedback based on Demodulation Reference Signals (DMRSs) after the first channel measurement feedback is performed; a second feedback unit configured to perform a second channel measurement according to the DMRSs when determining to perform the second channel measurement feedback, and transmit the second channel measurement feedback to the base station according to a second channel measurement result.

With the hybrid channel quality measurement method and the user equipment according to the above aspects of the present invention, it is possible to trigger the DMRS-based channel measurement(s) by certain conditions after performing the CSI-RS measurement(s) in a manner of utilizing the CSI-RSs and the DMRSs in combination for channel measurements. Therefore, the method and the user equipment of the present invention can flexibly perform channel and interference measurements as needed, and can obtain more accurate channel measurement results.

BRIEF DESCRIPTION OF THE DRAWINGS

The above and other objects, features and advantages of the present invention will become clearer by describing embodiments of the present invention in details with reference to the accompanying drawings.

DESCRIPTION OF THE EMBODIMENTS

A hybrid channel quality measurement method and a corresponding user equipment will be described below with reference to the accompanying drawings. Like reference numerals refer to like elements throughout the accompanying drawings. It should be understood that the embodiments described herein are merely illustrative and should not be constructed as limiting the scope of the present invention. In addition, the UE described herein may include various types of user terminals, for example, a mobile terminal or a fixed terminal. However, for convenience, the UE and the user terminal sometimes may be used interchangeably hereinafter. Terms such as "BS (Base Station)", "radio base station", "eNB", "gNB", "cell", "sector", "cell group", "carrier", and "component carrier" may also be used interchangeably. A radio base station is sometimes referred to terms such as a fixed station, a NodeB, an eNodeB (eNB), an access point, a transmission point, a reception point, a femto cell, a small cell, and the like.

In addition, in the embodiments of the present invention, channel measurements according to CSI-RSs may include a Zero Power CSI-RS based channel measurement, and may also include a Non-Zero Power CSI-RS based channel measurement. For example, the Zero Power CSI-RS based channel measurement may include the measurement on the interference, which may be periodic or non-periodic.

Figure 1:
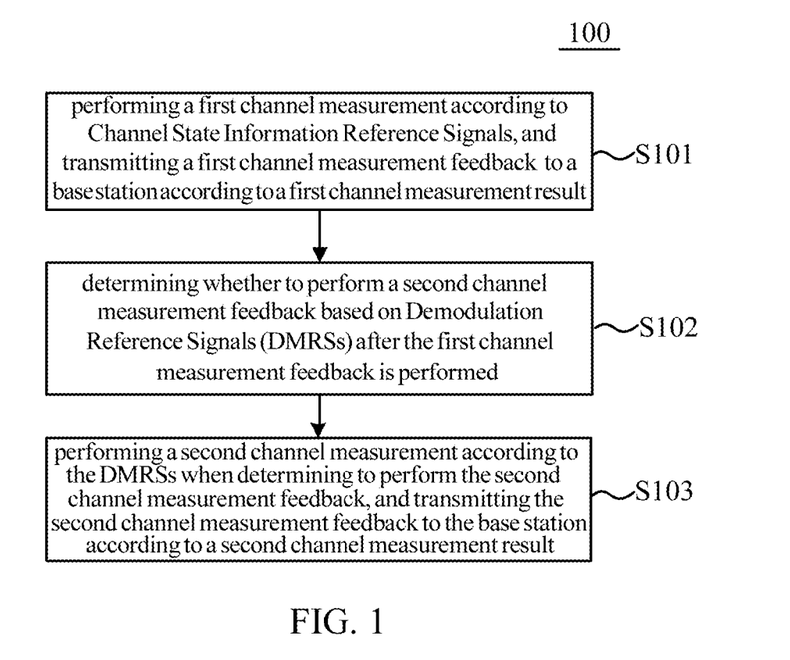
FIG. 1 is a flow chart of hybrid channel quality measurement method according to one embodiment of the present invention.

First, a hybrid channel quality measurement method performed by a user equipment according to embodiments of the present invention will be described with reference to FIG. 1. FIG. 1 shows a flow chart of a hybrid channel quality measurement method 100.

As shown in FIG. 1, in step S101, a first channel measurement is performed according to Channel State Information Reference Signals (CSI-RSs), and first channel measurement feedback is transmitted to a base station according to a first channel measurement result.

In this step, the first channel measurement according to CSI-RSs may be a ZP CSI-RS based measurement, or may be a NZP CSI-RS based measurement in an instant messaging solution. The first channel measurement according to CSI-RSs may use the CSI-RSs to estimate the channel quality of the downlink, thereby obtaining information such as channel quality indicator (CQI) and feeding it back to the base station. Alternatively, the first channel measurement according to CSI-RSs may be periodic or non-periodic. For example, coarse CQI(s) can be obtained from the first channel measurement according to CSI-RSs.

According to one example of the present invention, when performing channel measurements based on the CSI-RSs, in an initial state, resources used by the CSI-RSs may be configured. That is, downlink resources for channel measurements and/or interference measurements and/or uplink resources for uplink reports may be defined.

When performing channel measurements based on the CSI-RSs, for downlink resource configurations used for the channel measurements, antenna ports and/or the resource configurations may be configured by RRC signaling, then a part of the above resources configured by RRC are activated when measurements are needed, and a part of the activated resources are trigged by DCI to perform the channel measurements; or the antenna ports, periods, offsets, and/or the resource configurations may be configured by RRC signaling, then a part of the resources configured by RRC are activated to perform the channel measurements when measurements are needed, and the above activations can be done by MAC CE signaling.

For downlink resource configurations used for interference measurements, an implicit or explicit indication manner may be used to indicate resources configured for the interference measurements respectively. Alternatively, in the implicit manner, in one embodiment of the present invention, the interference measurements may be performed by resources that are activated but not triggered by DCI for channel measurements. In another embodiment of the invention, the interference measurements may be performed by resources configured by RRC signaling but not activated for channel measurements. In addition, in the explicit manner, antenna ports and/or the resource configurations may be configured by RRC signaling, then a part of the above resources configured by RRC are activated when measurements are needed, and a part of the activated resources are trigged by DCI to perform the interference measurements; or the antenna ports, periods, offsets, and/or the resource configurations may be configured by RRC signaling, then a part of the resources configured by RRC are activated to perform the interference measurements when measurements are needed, and the above activations can be done by MAC CE signaling.

When performing channel measurements according to CSI-RSs, CSI-RS signals may be received and measured by using downlink resources, and then measurement results are fed back through uplink resources. Alternatively, for configurations of the uplink resources used for the uplink reports, contents that a user equipment feeds back to a base station and/or the adopted feedback resources may be configured. Specifically, in one embodiment of the present invention, the feedback contents may be only CQIs; in another embodiment of the present invention, the feedback contents may be CQIs and PMIs, where, alternatively, PMI feedbacks may be performed by reusing a manner of class B (K=1) in LTE. In another embodiment of the present invention, resources for feedbacks may be configured in accordance with the uplink grant design in LTE. Alternatively, the uplink resources depend on the triggered channel resource setting indexes.

In step S102, it is determined whether to perform a second channel measurement feedback based on Demodulation Reference Signals (DMRSs) after the first channel measurement feedback is performed.

In one embodiment of the present invention, after the first channel measurement feedback is performed, it is determined whether the base station performs downlink scheduling for the user equipment; when the user equipment is scheduled by the base station, it is determined that the second channel measurement feedback based on DMRSs is performed after the first channel measurement feedback is performed. That is, in one embodiment of the present invention, the second channel measurement feedback according to DMRSs may be triggered or activated by feedbacks according to CSI-RSs. For example, both the first channel measurement result according to CSI-RSs and the second channel measurement result according to DMRSs may be one or more times respectively. Specifically, the DMRS-based second channel measurement may be performed once or multiple times consecutively after one CSI-RS-based first channel measurement is performed, or the DMRS-based second channel measurement may also be performed once or multiple times consecutively after multiple CSI-RS-based first channel measurements are performed.

In another embodiment of the present invention, after the first channel measurement feedback is performed, it may be determined whether downlink grant information includes information regarding triggering the second channel measurement feedback when the base station performs the downlink scheduling for the user equipment. When the information regarding triggering the second channel measurement feedback is included, it is determined that the second channel measurement feedback based on DMRSs is performed after the first channel measurement feedback is performed.

In one embodiment of the present invention, the second channel measurement according to DMRSs may be triggered by explicit indication information or implicit indication information regarding triggering the second channel measurement feedback in the downlink grant information. For example, the second channel measurement according to DMRSs may be triggered by indication information included in DCIs, or may be triggered by parameters already included in DCIs.

In one embodiment of the present invention, when the information regarding triggering the second channel measurement feedback is included, it may be determined that the second channel measurement feedback based on currently received DMRSs is performed after the first channel measurement feedback is performed. In another embodiment of the present invention, when the information regarding triggering the second channel measurement feedback is included, it may also be determined that after the first channel measurement feedback is performed, the second channel measurement feedback based on a received DMRS upon receiving a DMRS each time is performed. Therefore, both the first channel measurement result according to CSI-RSs and the second channel measurement result according to DMRSs may be one or more times respectively. For example, the DMRS-based second channel measurement may be performed once or multiple times consecutively after one CSI-RS-based first channel measurement is performed, or the DMRS-based second channel measurement may also be performed once or multiple times consecutively after multiple CSI-RS-based first channel measurements are performed.

In one embodiment of the present invention, alternatively, it may be determined whether the base station performs the downlink scheduling for the user equipment within a predetermined time period after the first channel measurement feedback is performed. When the base station performs the downlink scheduling for the user equipment within the predetermined time period after the first channel measurement feedback is performed, the second channel measurement feedback is transmitted to the base station; and when the base station does not perform the downlink scheduling for the user equipment within the predetermined time period after the first channel measurement feedback is performed, if the channel state needs to be reported to the base station, the first channel measurement feedback may be transmitted to the base station, for example, a previous CQI measurement result may be reported to the base station. That is, whether the second channel measurement feedback is performed may be determined by determining whether the downlink scheduling is within the predetermined time period. For example, the second channel measurement according to DMRSs may be performed when transmitting downlink data within 5 ms before the first channel measurement result according to CSI-RSs is reported, and when the time interval exceeds 5 ms, the previous CSI-RS-based CQI measurement result is reported to the base station.

In step S103, when it is determined to perform the second channel measurement feedback, a second channel measurement according to DMRSs is performed, and the second channel measurement feedback is transmitted to the base station according to a second channel measurement result. Here, the DMRS-based second channel measurement result can more accurately reflect the interference between multiple users than the CSI-RS-based first channel measurement result, and thus is more accurate.

In this step, the DMRS-based second channel measurement result may be reported according to resources configured by RRC signaling. For example, in one embodiment of the present invention, the second channel measurement feedback may be transmitted to the base station by using feedback channels of Hybrid Automatic Repeat reQuest (HARQ). For example, the DMRS-based second channel measurement result may be hybrid encoded and reported with HARQ.

In another embodiment of the present invention, the second channel measurement feedback may also be transmitted to the base station by using resources for transmitting the first channel measurement feedback to the base station according to a correspondence between the CSI-RSs and the DMRSs. For example, when one CSI-RS measurement is required and one or more DMRS measurements are performed, the DMRS-based second channel measurement result may be fed back by using resources for the CSI-RS-based first channel measurement feedback. Also, for example, when multiple CSI-RS measurements and multiple DMRS measurements need to be performed respectively, it may be determined which resource for the first channel measurement feedback is used for reporting the results of the second channel measurement feedback according to a correspondence among the respective multiple resources. For example, when measurement resources used by CSI-RSs are CSI-RS measurement resource 1 and CSI-RS measurement resource 2 (referred to as CSI resource 1 and CSI resource 2), and corresponding reporting resources are resource 1 indicated by uplink grant information and resource 2 indicated by uplink grant information (referred to as reporting resource 1 and reporting resource 2), in the process of performing the DMRS-based second channel measurement, the reporting resources for the DMRS-based second channel measurement result may be determined by the correspondence between two DMRS resources (DMRS resource 1 and DMRS resource 2) and (the CSI resource 1 and the CSI resource 2). For example, when the DMRS resource 2 has a correspondence with the CSI resource 1, the DMRS-based second channel measurement result may be fed back by using the reporting resource 1 corresponding to the CSI resource 1.

Alternatively, the correspondence between the CSI-RSs and the DMRSs may be determined by multiplexing the relationship shown by Quasi Co-Location (QCL), or the correspondence between the CSI-RSs and the DMRSs may be determined according to the relationship shown by a preset table. In addition, the measurement resources used in the DMRS-based second channel measurement may also be measured by using the measurement resources corresponding to the CSI-RSs through the above correspondence. The above manner of multiplexing measurement resources and reporting resources for the CSI-RSs in the DMRS channel measurements can avoid wasting resources and signaling overhead, and save system resources.

In another embodiment of the present invention, when the user equipment is scheduled by the base station, signal demodulations may be performed according to the CSI-RSs used for performing the first channel measurement and the DMRSs used for performing the second channel measurement. The above method can utilize the measurements of the CSI-RSs to assist DMRS demodulations, thereby obtaining more accurate demodulation information according to the channel and interference measurement results of the CSI-RSs.

In another embodiment of the present invention, it may further includes: when reference signal reset information is received, the second channel measurement feedback based on DMRSs may be stopped. For example, the reference signal reset information may be information indicating to reset CSI-RSs, and when the CSI-RSs are reset, the DMRS-based second channel measurement feedback will be stopped. Preferably, when the user equipment is scheduled by the base station, after determining to perform the second channel measurement feedback based on DMRSs, the DMRS-based second channel measurement may be stopped according to the reference signal reset information.

In another embodiment of the present invention, it may further includes: when information regarding stopping the second channel measurement feedback is received, the second channel measurement feedback based on DMRSs may be stopped. For example, one additional bit can be used to indicate whether to perform the second channel measurement feedback. Alternatively, when the bit is "1", it indicates to continue the second channel measurement feedback; and until the bit is "0", it indicates to stop the second channel measurement feedback. Alternatively, the bit information may also be hybrid encoded with PDSCH Resource Mapping and Quasi Co-Location Indication, thereby reducing signaling overhead.

With the hybrid channel quality measurement method according to the embodiments of the present invention, it is possible to utilize the CSI-RSs and the DMRSs in combination for channel measurements, and to trigger the DMRS-based channel measurement(s) by certain conditions after performing the CSI-RS measurement(s). Therefore, the method of the embodiments of the present invention can flexibly perform channel and interference measurements as needed, and can obtain more accurate channel measurement results.

Figure 2:
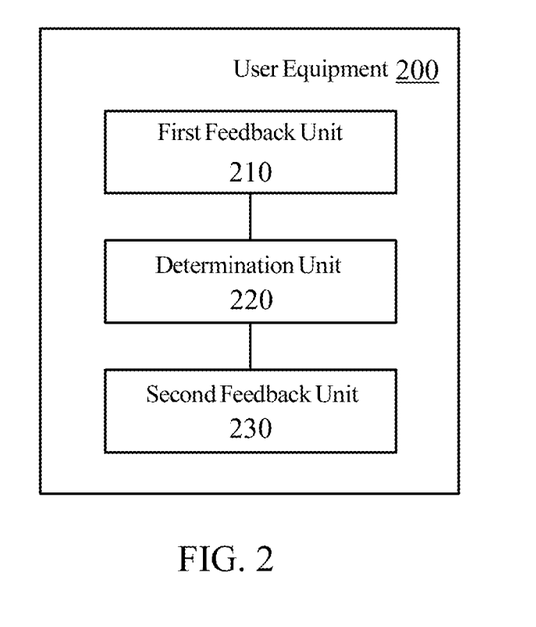
FIG. 2 is a structural block diagram of a user equipment according to one embodiment of the present invention.

Next, a user equipment according to the embodiments of the present invention will be described with reference to FIG. 2. FIG. 2 is a block diagram showing a user equipment 200 according to the embodiments of the present invention. As shown in FIG. 2, the user equipment 200 includes a first feedback unit 210, a determination unit 220 and a second feedback unit 230. The user equipment 230 may include other components in addition to these units. However, since these components are not related to the content of the embodiments of the present invention, the illustration and description thereof are omitted herein. In addition, since the specific details of the operations described below performed by the user equipment 200 according to the embodiments of the present invention are the same as those described above with reference to FIG. 1, repeated description of the same details is omitted herein to avoid repetition.

The first feedback unit 210 of the user equipment 200 performs a first channel measurement according to Channel State Information Reference Signals (CSI-RSs), and transmits a first channel measurement feedback to a base station according to a first channel measurement result.

The first channel measurement performed by the first feedback unit 210 according to CSI-RSs may be a ZP CSI-RS based measurement, or may be a NZP CSI-RS based measurement in an instant messaging solution. The first channel measurement according to CSI-RSs may use the CSI-RSs to estimate the channel quality of the downlink, thereby obtaining information such as channel quality indicator (CQI) and feeding it back to the base station. Alternatively, the first channel measurement according to CSI-RSs may be periodic or non-periodic. For example, coarse CQI(s) can be obtained from the first channel measurement according to CSI-RSs.

According to one example of the present invention, when the first feedback unit 210 performs channel measurements based on the CSI-RSs, in an initial state, resources used by the CSI-RSs may be configured. That is, downlink resources for channel measurements and/or interference measurements and/or uplink resources for uplink reports may be defined.

When the first feedback unit 210 performs channel measurements based on the CSI-RSs, for downlink resource configurations used for the channel measurements, antenna ports and/or the resource configurations may be configured by RRC signaling, then a part of the above resources configured by RRC are activated when measurements are needed, and a part of the activated resources are trigged by DCI to perform the channel measurements; or the antenna ports, periods, offsets, and/or the resource configurations may be configured by RRC signaling, then a part of the resources configured by RRC are activated to perform the channel measurements when measurements are needed, and the above activations can be done by MAC CE signaling.

For downlink resource configurations used for interference measurements, an implicit or explicit indication manner may be used to indicate resources configured for the interference measurements respectively. Alternatively, in the implicit manner, in one embodiment of the present invention, the interference measurements may be performed by resources that are activated but not triggered by DCI for channel measurements. In another embodiment of the invention, the interference measurements may be performed by resources configured by RRC signaling but not activated for channel measurements. In addition, in the explicit manner, antenna ports and/or the resource configurations may be configured by RRC signaling, then a part of the above resources configured by RRC are activated when measurements are needed, and a part of the activated resources are trigged by DCI to perform the interference measurements; or the antenna ports, periods, offsets, and/or the resource configurations may be configured by RRC signaling, then a part of the resources configured by RRC are activated to perform the interference measurements when measurements are needed.

When the first feedback unit 210 performs channel measurements according to CSI-RSs, CSI-RS signals may be received and measured by using downlink resources, and then measurement results are fed back through uplink resources. Alternatively, for configurations of the uplink resources used for the uplink reports, contents that a user equipment feeds back to a base station and/or the adopted feedback resources may be configured. Specifically, in one embodiment of the present invention, the feedback contents may be only CQIs; in another embodiment of the present invention, the feedback contents may be CQIs and PMIs, where, alternatively, PMI feedbacks may be performed by reusing a manner of class B (K=1) in LTE. In another embodiment of the present invention, resources for feedbacks may be configured in accordance with the uplink grant design in LTE. Alternatively, the uplink resources depend on the triggered channel resource setting indexes.

The determination unit 220 determines whether to perform a second channel measurement feedback based on Demodulation Reference Signals (DMRSs) after the first channel measurement feedback is performed.

In one embodiment of the present invention, after the first channel measurement feedback is performed, the determination unit 220 may determine whether the base station performs downlink scheduling for the user equipment; when the user equipment is scheduled by the base station, the determination unit 220 may determine to perform the second channel measurement feedback based on DMRSs after the first channel measurement feedback is performed. That is, in one embodiment of the present invention, the second channel measurement feedback according to DMRSs may be triggered or activated by feedbacks according to CSI-RSs. For example, both the first channel measurement result according to CSI-RSs and the second channel measurement result according to DMRSs may be one or more times respectively. Specifically, the DMRS-based second channel measurement may be performed once or multiple times consecutively after one CSI-RS-based first channel measurement is performed, or the DMRS-based second channel measurement may also be performed once or multiple times consecutively after multiple CSI-RS-based first channel measurements are performed.

In another embodiment of the present invention, after the first channel measurement feedback is performed, the determination unit 220 may determine whether downlink grant information includes information regarding triggering the second channel measurement feedback when the base station performs the downlink scheduling for the user equipment. When the information regarding triggering the second channel measurement feedback is included, the determination unit 220 may determine to perform the second channel measurement feedback based on DMRSs after the first channel measurement feedback is performed.

In one embodiment of the present invention, the second channel measurement according to DMRSs may be triggered by explicit indication information or implicit indication information regarding triggering the second channel measurement feedback in the downlink grant information. For example, the second channel measurement according to DMRSs may be triggered by indication information included in DCIs, or may be triggered by parameters already included in DCIs.

In one embodiment of the present invention, when the information regarding triggering the second channel measurement feedback is included, the determination unit 220 may determine to perform the second channel measurement feedback based on currently received DMRSs after the first channel measurement feedback is performed. In another embodiment of the present invention, when the information regarding triggering the second channel measurement feedback is included, the determination unit 220 may also determine, after the first channel measurement feedback is performed, to perform the second channel measurement feedback based on a received DMRS upon receiving a DMRS each time. Therefore, both the first channel measurement result according to CSI-RSs and the second channel measurement result according to DMRSs may be one or more times respectively. For example, the DMRS-based second channel measurement may be performed once or multiple times consecutively after one CSI-RS-based first channel measurement is performed, or the DMRS-based second channel measurement may also be performed once or multiple times consecutively after multiple CSI-RS-based first channel measurements are performed.

In one embodiment of the present invention, alternatively, the determination unit 220 may determine whether the base station performs the downlink scheduling for the user equipment within a predetermined time period after the first channel measurement feedback is performed. When the base station performs the downlink scheduling for the user equipment within the predetermined time period after the first channel measurement feedback is performed, the second channel measurement feedback is transmitted to the base station; and when the base station does not perform the downlink scheduling for the user equipment within the predetermined time period after the first channel measurement feedback is performed, if the channel state needs to be reported to the base station, the first channel measurement feedback may be transmitted to the base station, for example, a previous CQI measurement result may be reported to the base station. That is, whether the second channel measurement feedback is performed may be determined by determining whether the downlink scheduling is within the predetermined time period. For example, the second channel measurement according to DMRSs may be performed when transmitting downlink data within 5 ms before the first channel measurement result according to CSI-RSs is reported, and when the time interval exceeds 5 ms, the previous CSI-RS-based CQI measurement result is reported to the base station.

When it is determined to perform the second channel measurement feedback, the second feedback unit 230 performs a second channel measurement according to DMRSs, and transmits the second channel measurement feedback to the base station according to a second channel measurement result. Here, the DMRS-based second channel measurement result can more accurately reflect the interference between multiple users than the CSI-RS-based first channel measurement result, and thus is more accurate.

The second feedback unit 230 may report the DMRS-based second channel measurement result according to resources configured by RRC signaling. For example, in one embodiment of the present invention, the second channel measurement feedback may be transmitted to the base station by using feedback channels of Hybrid Automatic Repeat reQuest (HARQ). For example, the DMRS-based second channel measurement result may be hybrid encoded and reported with HARQ.

In another embodiment of the present invention, the second feedback unit 230 may also transmit the second channel measurement feedback to the base station by using resources for transmitting the first channel measurement feedback to the base station according to correspondence between the CSI-RSs and the DMRSs. For example, when one CSI-RS measurement is required to be performed and one or more DMRS measurements are performed, the DMRS-based second channel measurement result may be fed back by using resources for the CSI-RS-based first channel measurement feedback. Also, for example, when multiple CSI-RS measurements and multiple DMRS measurements need to be performed respectively, it may be determined which resource for the first channel measurement feedback is used for reporting the results of the second channel measurement feedback according to a correspondence among the respective multiple resources. For example, when measurement resources used by CSI-RSs are CSI-RS measurement resource 1 and CSI-RS measurement resource 2 (referred to as CSI resource 1 and CSI resource 2), and corresponding reporting resources are resource 1 indicated by uplink grant information and resource 2 indicated by uplink grant information (referred to as reporting resource 1 and reporting resource 2), in the process of performing the DMRS-based second channel measurement, the reporting resources for the DMRS-based second channel measurement result may be determined by the correspondence between two DMRS resources (DMRS resource 1 and DMRS resource 2) and (the CSI resource 1 and the CSI resource 2). For example, when the DMRS resource 2 has a correspondence with the CSI resource 1, the DMRS-based second channel measurement result may be fed back by using the reporting resource 1 corresponding to the CSI resource 1.

Alternatively, the second feedback unit 230 may determine the correspondence between the CSI-RSs and the DMRSs by multiplexing the relationship shown by Quasi Co-Location (QCL), or determine the correspondence between the CSI-RSs and the DMRSs according to the relationship shown by a preset table. In addition, the measurement resources used in the DMRS-based second channel measurement may also be measured by using the measurement resources corresponding to the CSI-RSs through the above correspondence. The above manner of multiplexing measurement resources and reporting resources for the CSI-RSs in the DMRS channel measurements can avoid wasting resources and signaling overhead, and save system resources.

In another embodiment of the present invention, when the user equipment is scheduled by the base station, signal demodulations may be performed according to the CSI-RSs used for performing the first channel measurement and the DMRSs used for performing the second channel measurement. The above method can utilize the measurements of the CSI-RSs to assist DMRS demodulations, thereby obtaining more accurate demodulation information according to the channel and interference measurement results of the CSI-RSs.

In another embodiment of the present invention, the second feedback unit 230 may further includes: when reference signal reset information is received, the second channel measurement feedback based on DMRSs may be stopped. For example, the reference signal reset information may be information indicating to reset CSI-RSs, and when the CSI-RSs are reset, the DMRS-based second channel measurement feedback will be stopped. Preferably, when the user equipment is scheduled by the base station, after determining to perform the second channel measurement feedback based on DMRSs, the DMRS-based second channel measurement may be stopped according to the reference signal reset information.

In another embodiment of the present invention, the second feedback unit 230 may further includes: when information regarding stopping the second channel measurement feedback is received, the second channel measurement feedback based on DMRSs may be stopped. For example, one additional bit can be used to indicate whether to perform the second channel measurement feedback. Alternatively, when the bit is "1", it indicates to continue the second channel measurement feedback; and until the bit is "O", it indicates to stop the second channel measurement feedback.

With the user equipment according to the embodiments of the present invention, it is possible to utilize the CSI-RSs and the DMRSs in combination for channel measurements, and to trigger the DMRS-based channel measurement(s) by certain conditions after performing the CSI-RS measurement(s). Therefore, the method of the embodiments of the present invention can flexibly perform channel and interference measurements as needed, and can obtain more accurate channel measurement results.

<Hardware Structure>

Figure 3:
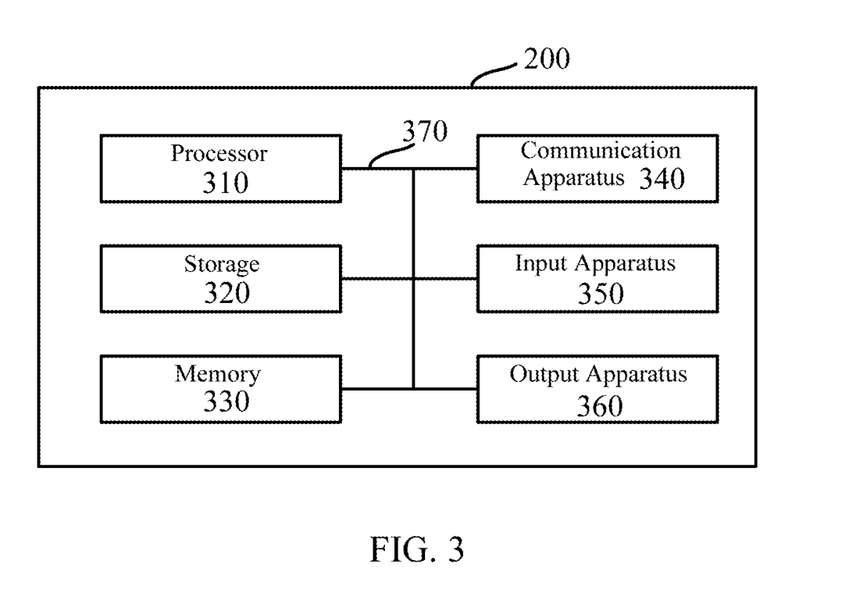
FIG. 3 is a diagram showing an example of a hardware structure of a user equipment involved in one implementation of the present invention.

The user terminal and so on in one embodiment of the present invention may function as a computer that executes the processes of the radio communication method of the present invention. FIG. 3 is a diagram that shows an example of a hardware structure of the radio base station and the user terminal according to one implementation of the present invention. The above described user terminal 200 may be physically designed as a computer apparatus including a processor 310, a storage 320, a memory 330, a communication apparatus 340, an input apparatus 350, an output apparatus 360, and a bus 370 and the like.

In addition, in the following description, the word "apparatus" may be replaced by "circuit", "device", "unit" and so on. The hardware structure of the user terminal 200 may be designed to include one or more of each apparatus shown in the drawings, or may be designed not to include part of the apparatus.

For example, although only one processor 310 is shown, a plurality of processors may be provided. Furthermore, processes may be implemented with one processor, or processes may be implemented either simultaneously or in sequence, or in different manners, on two or more processors. In addition, the processor 310 may be implemented with one or more chips.

Each function of the user terminal 200 is implemented by reading predetermined software (program) on hardware such as the processor 310 and the memory 320, so as to make the processor 310 perform calculations, and by controlling the communication carried out by the communication apparatus 340, and the reading and/or writing of data in the memory 320 and the storage 330.

The processor 310 may control the whole computer by, for example, running an operating system. The processor 310 may be configured with a central processing unit (CPU), which includes interfaces with peripheral apparatus, control apparatus, computing apparatus, a register and so on.

Furthermore, the processor 310 reads programs (program codes), software modules or data, from the storage 330 and/or the communication apparatus 340, into the memory 320, and executes various processes according to these. As for the programs, programs to allow computers to execute at least part of the operations of the above-described embodiments may be used.

The memory 320 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 320 may be referred to as a "register", a "cache", a "main memory" (primary storage apparatus) and so on. The memory 320 can store executable programs (program codes), software modules and so on for implementing the radio communication methods according to embodiments of the present invention.

The storage 330 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and other appropriate storage media. The storage 330 may be referred to as "secondary storage apparatus."

The communication apparatus 340 is hardware (transmitting/receiving device) for allowing inter-computer communication by using wired and/or wireless networks, and may be referred to as, for example, a "network device", a "network controller", a "network card", a "communication module" and so on. The communication apparatus 340 may include a high frequency switch, a duplexer, a filter, a frequency synthesizer, and the like in order to implement, for example, FDD (Frequency Division Duplex) and/or TDD (Time Division Duplex).

The input apparatus 350 is an input device for receiving input from the outside (for example, a keyboard, a mouse, a microphone, a switch, a button, a sensor and so on). The output apparatus 360 is an output device for allowing sending output to the outside (for example, a display, a speaker, an LED (Light Emitting Diode) lamp and so on). In addition, the input apparatus 350 and the output apparatus 360 may be provided in an integrated structure (for example, a touch panel).

Furthermore, these pieces of apparatus, including the processor 310, the memory 320 and so on are connected by the bus 370 so as to communicate information. The bus 370 may be formed with a single bus, or may be formed with buses that vary between pieces of apparatus.

Also, the user terminal 200 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 310 may be installed with at least one of these pieces of hardware.

(Variations)

In addition, the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be referred to as a carrier frequency, a cell, or the like.

In addition, the radio frame may be composed of one or more periods (frames) in the time domain. Each of the one or more periods (frames) constituting the radio frame may also be referred to as a subframe. Further, a subframe may be composed of one or more slots in the time domain. The subframe may be a fixed length of time duration (eg, 1 ms) that is independent of the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Furthermore, the slot may also be a time unit configured based on parameter. Furthermore, a slot may also include a plurality of microslots. Each microslot may be comprised of one or more symbols in the time domain. Furthermore, a microslot may also be referred as "a subframe".

A radio frame, a subframe, a slot, a microslot and a symbol all represent the time unit when transmitting signals. A radio frame, a subframe, a slot, a microslot and a symbol may also use other names that correspond to each other. For example, one subframe may be referred to as a "transmission time interval (TTI)", and a plurality of consecutive subframes may also be referred to as a "TTI", and one slot or one microslot may also be referred to as a "TTI." That is, a subframe and/or a TTI may be a subframe (1 ms) in existing LTE, may be a shorter period than 1 ms (for example, one to thirteen symbols), or may be a longer period of time than 1 ms. It should be noted that a unit indicating a TTI may also be referred to as a slot, a microslot, or the like instead of a subframe.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. It should be noted that the definition of TTIs is not limited to this.

TTIs may be channel-coded data packets (transport blocks), code blocks, and/or codeword transmission time units, or may be the unit of processing in scheduling, link adaptation and so on. It should be noted that, when a TTI is given, the time interval (e.g., the number of symbols) actually mapped to the transport block, code block, and/or codeword may also be shorter than the TTI.

In addition, when one slot or one microslot is called a TTI, more than one TTI (i.e., more than one slot or more than one microslot) may also become the scheduled minimum time unit. Furthermore, the number of slots (the number of microslots) constituting the minimum time unit of the scheduling may be controlled.

A TTI having a time duration of 1 ms may be referred to as a "normal TTI" (TTI in LTE Rel. 8 to 12), a "standard TTI", a "long TTI", a "normal subframe", a "standard subframe", or a "long subframe", and so on. A TTI that is shorter than a normal TTI may be referred to as a "shortened TTI", a "short TTI", a "partial (or fractional) TTI", a "shortened subframe", a "short subframe", a "microslot", or a "short microslot" and so on.

It should be noted that, a long TTI (eg, a normal TTI, a subframe, etc.) may be replaced with a TTI having a time duration exceeding 1 ms, and a short TTI (eg, a shortened TTI, and so on) may also be replaced with a TTI having a TTI duration shorter than the long TTI and a TTI duration exceeding 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one microslot, one subframe or one TTI duration. One TTI and one subframe each may be comprised of one or more resource blocks, respectively. It should be noted that one or more RBs may also be referred to as a "physical resource block (PRB (Physical RB))", a "Sub-Carrier Group (SCG)", a "Resource Element Group (REG)", a "PRG pair", an "RB pair" and so on.

Also, a resource block may also be composed of one or more resource elements (RE). For example, one RE can be a radio resource area of a subcarrier and a symbol.

In addition, the above-described structures of radio frames, subframes, slots, microslots and symbols and so on are simply examples. For example, configurations such as the number of subframes included in a radio frame, the number of slots of each subframe or radio frame, the number or microslots included in a slot, the number of symbols and RBs included in a slot or microslot, the number of subcarriers included in an RB, the number of symbols in a TTI, the symbol duration and the cyclic prefix (CP) duration can be variously changed.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs).

Also, reporting of specified information (for example, reporting of "being X") is not limited to being explicitly performed, and may be performed implicitly (for example, by not performing the reporting of the specified information, or by reporting of other information).

Determination may be performed by a value (0 or 1) represented by 1 bit, or by a true or false value (Boolean value) represented by true or false, and may also be performed by comparison with numerical values (for example, comparison with specified values).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

In the present specification, terms such as "BS (Base Station)", "radio base station", "eNB", "gNB", "cell", "sector", "cell group", "carrier", and "component carrier" may be used interchangeably. The radio base station is sometimes referred to terms such as a fixed station, a NodeB, an eNodeB (eNB), an access point, a transmission point, a reception point, a femto cell, a small cell, and the like.

A radio base station can accommodate one or more (eg, three) cells (also referred to as sectors). When the radio base station accommodates a plurality of cells, an entire coverage area of the radio base station can be divided into a plurality of smaller regions, and each smaller region may also provide communication services by a radio base station subsystem (for example, a small indoor radio base station (RRH (Remote Radio Head)). The term "cell" or "sector" refers to a part or the entirety of the coverage area of a radio base station and/or a radio base station subsystem that performs communication services in the coverage.

In the present specification, terms such as "MS (Mobile Station)", "user terminal", "UE (User Equipment)", and "terminal" may be used interchangeably. A radio base station is sometimes referred to terms such as a fixed station, a NodeB, an eNodeB (eNB), an access point, a transmission point, a reception point, a femto cell, a small cell, and the like.

A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

In addition, a "radio base station" in the present specification can also be replaced with a "user terminal". For example, respective modes/embodiments of the present invention can also be applied to a structure in which communications between a radio base station and a user terminal is replaced with Device-to-Device (D2D) communications among a plurality of user terminals. At this time, the functions of the radio base station 700 described above can be regarded as the functions of the user terminal 800. In addition, words such as "uplink" and "downlink" can also be replaced with "side". For example, an "uplink channel" can also be replaced with a "side channel".

Similarly, a "user terminal" in the present specification can also be replaced with a "radio base station". At this time, the functions of the user terminal 800 described above can be regarded as the functions of the radio base station 700.

In the present specification, specific operations set to be performed by a radio base station may sometimes be performed by an upper node thereof depending on situations. Obviously, in a network composed of one or more network nodes having a base station, various actions performed for communication with the terminal may be performed by the base station, one or more network nodes other than the base station (for example, a Mobility Management Entity (MME), a Serving-Gateway (S-GW), etc., may be considered), or a combination thereof.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judging" and "determining" as used herein may encompass a wide variety of actions. For example, "judging" and "determining" may be interpreted to mean making judgments and determinations related to calculating, computing, processing, deriving, investigating, looking up (for example, searching a table, a database or some other data structure), ascertaining and so on. Furthermore, "judging" and "determining" may be interpreted to mean making judgments and determinations related to receiving (for example, receiving information), transmitting (for example, transmitting information), inputting, outputting, accessing (for example, accessing data in a memory) and so on. In addition, "judging" and "determining" as used herein may be interpreted to mean making judgments and determinations related to resolving, selecting, choosing, establishing, comparing and so on. In other words, "judging" and "determining" may be interpreted to mean making judgments and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A method performed by a terminal, comprising:

performing a first channel measurement according to Channel State Information Reference Signals (CSI-RSs), and transmitting a first channel measurement feedback to a base station according to a first channel measurement result;

determining whether to perform a second channel measurement feedback based on Demodulation Reference Signals (DMRSs) after the first channel measurement feedback is performed;

performing a second channel measurement according to the DMRSs when determining to perform the second channel measurement feedback, and transmitting the second channel measurement feedback to the base station according to a second channel measurement result.

2. The method of claim 1, wherein the determining whether to perform the second channel measurement feedback based on the Demodulation Reference Signals (DMRSs) after the first channel measurement feedback is performed comprises:

after the first channel measurement feedback is performed, determining whether the base station performs downlink scheduling for the terminal;

when the terminal is scheduled by the base station, determining to perform the second channel measurement feedback based on the DMRSs after the first channel measurement feedback is performed.

3. The method of claim 1, wherein the determining whether to perform the second channel measurement feedback based on the Demodulation Reference Signals (DMRSs) after the first channel measurement feedback is performed comprises:

after the first channel measurement feedback is performed, determining whether downlink grant information includes information regarding triggering the second channel measurement feedback when the base station performs downlink scheduling for the terminal;

when the information regarding triggering the second channel measurement feedback is included, determining to perform the second channel measurement feedback based on the DMRSs after the first channel measurement feedback is performed.

4. The method of claim 3, wherein the determining to perform the second channel measurement feedback based on the DMRSs after the first channel measurement feedback is performed when the information regarding triggering the second channel measurement feedback is included comprises:

when the information regarding triggering the second channel measurement feedback is included, determining to perform the second channel measurement feedback based on currently received DMRSs after the first channel measurement feedback is performed; or when the information regarding triggering the second channel measurement feedback is included, determining, after the first channel measurement feedback is performed, to perform the second channel measurement feedback based on a received DMRS upon receiving a DMRS each time until information regarding stopping the second channel measurement feedback is received.

5. The method of claim 2, further comprising:
- determining whether the base station performs the downlink scheduling for the terminal within a predetermined time period after the first channel measurement feedback is performed, and
- when the base station does not perform the downlink scheduling for the terminal within the predetermined time period after the first channel measurement feedback is performed, transmitting the first channel measurement feedback to the base station again.

6. The method of claim 1, further comprising:
- when reference signal reset information is received, stopping the second channel measurement feedback based on the DMRSs.

7. The method of claim 1, wherein the transmitting the second channel measurement feedback to the base station comprises:
- transmitting, according to a correspondence between the CSI-RSs and the DMRSs, the second channel measurement feedback to the base station by using resources for transmitting the first channel measurement feedback to the base station.

8. The method of claim 7, wherein
- determining the correspondence between the CSI-RSs and the DMRSs according to Quasi Co-Location (QCL).

9. The method of claim 1, wherein the transmitting the second channel measurement feedback to the base station comprises:
- transmitting the second channel measurement feedback to the base station by using feedback channels of Hybrid Automatic Repeat reQuest (HARD).

10. The method of claim 1, further comprising:
- when the terminal is scheduled by the base station, performing signal demodulations according to the CSI-RSs used for performing the first channel measurement and the DMRSs used for performing the second channel measurement.

11. A terminal, comprising:
- a first feedback unit configured to perform a first channel measurement according to Channel State Information Reference Signals (CSI-RSs), and transmit a first channel measurement feedback to a base station according to a first channel measurement result;
- a determination unit configured to determine whether to perform a second channel measurement feedback based on Demodulation Reference Signals (DMRSs) after the first channel measurement feedback is performed;
- a second feedback unit configured to perform a second channel measurement according to the DMRSs when determining to perform the second channel measurement feedback, and transmit the second channel measurement feedback to the base station according to a second channel measurement result.

12. The terminal of claim 11, wherein
after the first channel measurement feedback is performed, the determination unit determines whether the base station performs downlink scheduling for the terminal; and when the terminal is scheduled by the base station, the determination unit determines to perform the second channel measurement feedback based on the DMRSs after the first channel measurement feedback is performed.

13. The terminal of claim 11, wherein
after the first channel measurement feedback is performed, the determination unit determines whether downlink grant information includes information regarding triggering the second channel measurement feedback when the base station performs downlink scheduling for the terminal; and when the information regarding triggering the second channel measurement feedback is included, the determination unit determines to perform the second channel measurement feedback based on the DMRSs after the first channel measurement feedback is performed.

14. The terminal of claim 13, wherein
- when the information regarding triggering the second channel measurement feedback is included, the second feedback unit determines to perform the second channel measurement feedback based on currently received DMRSs after the first channel measurement feedback is performed; or
- when the information regarding triggering the second channel measurement feedback is included, the second feedback unit determines, after the first channel measurement feedback is performed, to perform the second channel measurement feedback based on a received DMRS upon receiving a DMRS each time until information regarding stopping the second channel measurement feedback is received.

15. The terminal of claim 12, wherein,
- the determination unit determines whether the base station performs the downlink scheduling for the terminal within a predetermined time period after the first channel measurement feedback is performed, and
- when the base station does not perform the downlink scheduling for the terminal within the predetermined time period after the first channel measurement feedback is performed, the first feedback unit transmits the first channel measurement feedback to the base station again.

16. The terminal of claim 11, wherein,
when reference signal reset information is received, the second feedback unit stops the second channel measurement feedback based on the DMRSs.

17. The terminal of claim 11, wherein
the second feedback unit transmits, according to a correspondence between the CSI-RSs and the DMRSs, the second channel measurement feedback to the base station by using resources for transmitting the first channel measurement feedback to the base station.

18. The terminal of claim 17, wherein
the second feedback unit determines the correspondence between the CSI-RSs and the DMRSs according to Quasi Co-Location (QCL).

19. The terminal of claim 11, wherein
the second feedback unit transmits the second channel measurement feedback to the base station by using feedback channels of Hybrid Automatic Repeat reQuest (HARD).

20. The terminal of claim 11, further comprising:
- a demodulation unit configured to perform signal demodulations according to the CSI-RSs used for performing the first channel measurement and the DMRSs used for performing the second channel measurement when the terminal is scheduled by the base station.

* * * * *